No. 614,826. Patented Nov. 29, 1898.
F. W. BEARDSLEY & W. CALHOUN.
COIN OPERATED BICYCLE LOCK.
(Application filed Aug. 17, 1896.)

(No Model.) 2 Sheets—Sheet 1.

WITNESSES:

INVENTORS
Frank W. Beardsley
and William Calhoun
BY
ATTORNEYS.

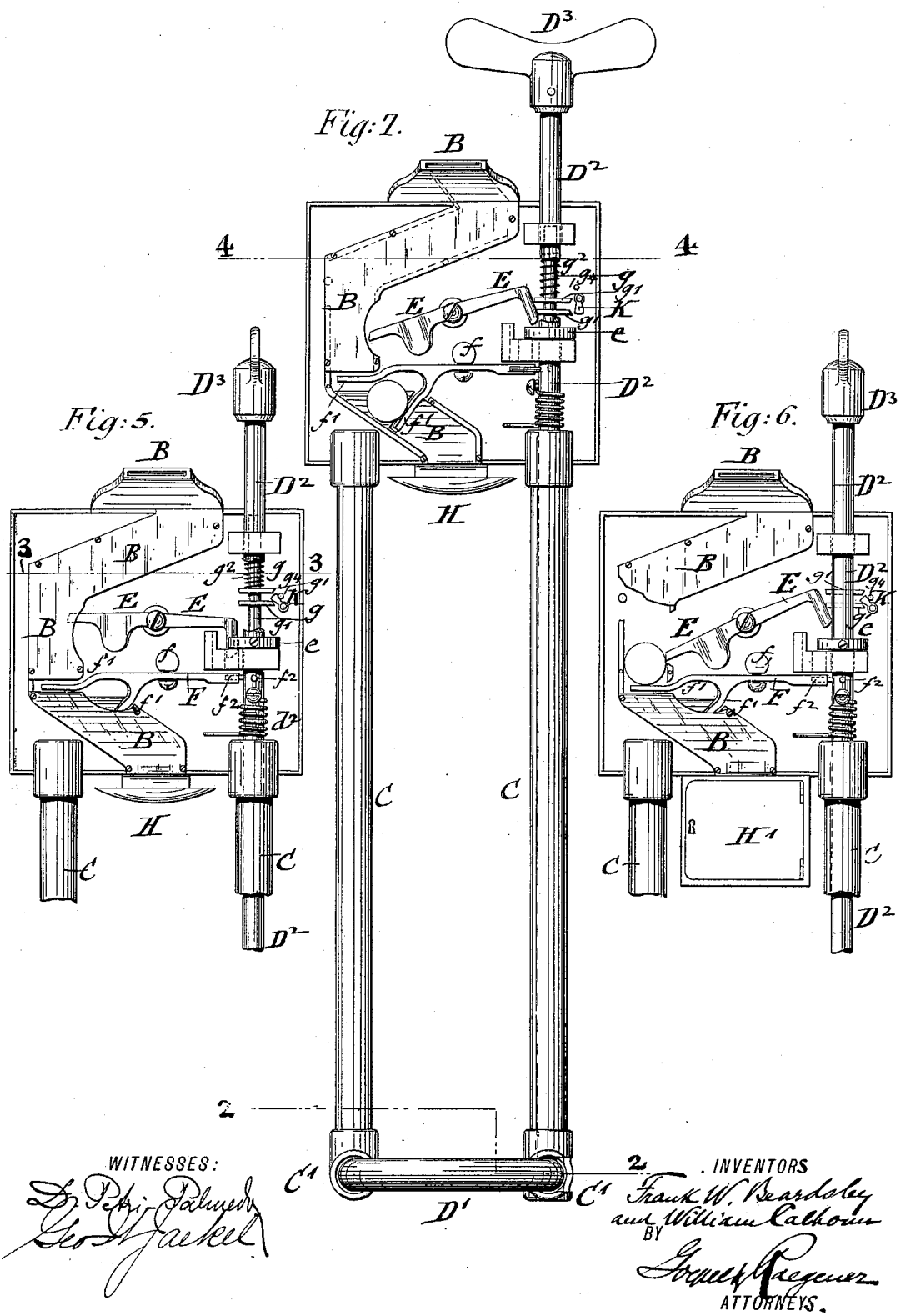

UNITED STATES PATENT OFFICE.

FRANK W. BEARDSLEY, OF BAYONNE, NEW JERSEY, AND WILLIAM CALHOUN, OF NEW YORK, N. Y.

COIN-OPERATED BICYCLE-LOCK.

SPECIFICATION forming part of Letters Patent No. 614,826, dated November 29, 1898.

Application filed August 17, 1896. Serial No. 603,002. (No model.)

*To all whom it may concern:*

Be it known that we, FRANK W. BEARDSLEY, residing at Bayonne, in the county of Hudson and State of New Jersey, and WILLIAM CALHOUN, residing in the city, county, and State of New York, citizens of the United States, have invented certain new and useful Improvements in Coin-Operated Bicycle-Locks, of which the following is a specification.

This invention has reference to an improved bicycle-lock of that class which is closed by suitable mechanism actuated by the insertion of a coin, so that a swinging bail embraces the rim and tire of one of the wheels of the bicycle and locks it in position until the bail is opened again by a key, which is retained in the lock when the bail is in open position, but which can be removed when the bail is in closed position.

Our invention consists of a coin-operated bicycle-lock which comprises a locking-bail formed of a stationary and a swinging section, the latter being placed in open or closed position on releasing a suitable coin-operated lever mechanism and a key-operated slide-rod, as will be fully described hereinafter and finally pointed out in the claims.

Figure 1:
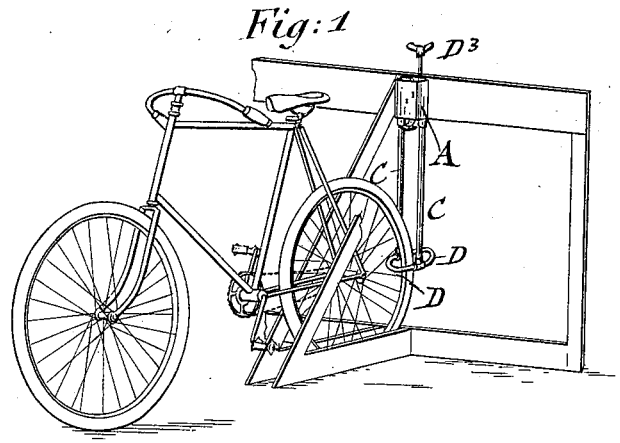
Figure 2:
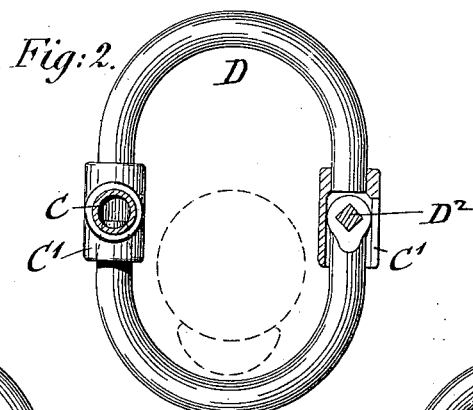
Figure 3:
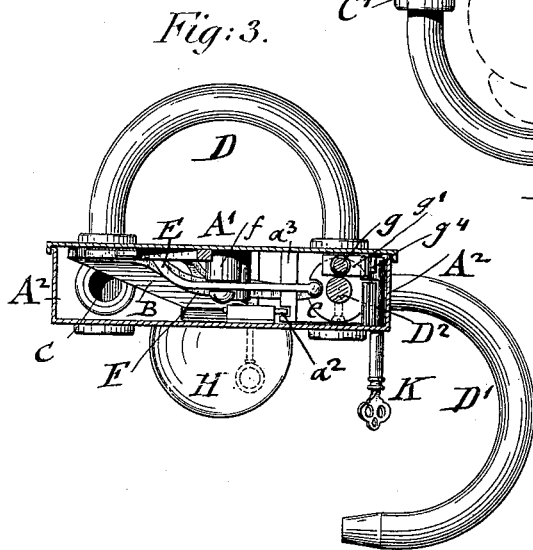
Figure 4:
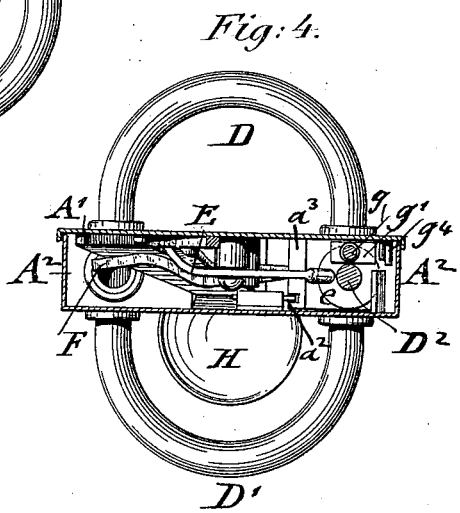

In the accompanying drawings, Figure 1 represents a perspective view of our improved coin-operated bicycle-lock, showing it applied to one of the wheels of the bicycle. Fig. 2 is a horizontal section on line 2 2, Fig. 7, showing the swinging bail of the bicycle-lock in plan view. Figs. 3 and 4 are respectively horizontal sections on lines 3 3, Fig. 5, and 4 4, Fig. 7. Fig. 5 is a side elevation of the bicycle-lock with the covering-plate removed, showing it in open position; and Figs. 6 and 7 are also side elevations of the lock with the covering-plate removed, showing the parts in their different relative positions.

Similar letters of reference indicate corresponding parts.

Referring to the drawings, A represents the lock mechanism of our improved coin-operated bicycle-lock, which is attached to the bicycle-stand in the proper relative position to the bicycle to be supported thereon, said lock mechanism being composed of a casing A', a coin-chute B, extending through the same, and coin-operated levers E and F within the casing. To the lower part of the casing are attached two stationary tubular rods C C, which are extended in downward direction to such a distance from the casing that their lower ends are at about the height of the axles of the safety-bicycle. The lower ends of the tubular rods C C are each provided with a horizontal socket C', the socket at the lower end of the right-hand rod C being recessed at its outer portion. A rod $D^2$ passes through this tubular rod C and through the casing A' of the lock A and extends some distance above the same, said rod being provided with a handle $D^3$ at its upper end. The lower ends of the tubular rods C C are connected by a stationary bail-section D, that extends at right angles to the rods C. A swinging bail-section D' is also attached at right angles to the rod $D^2$ and extended in front of the tubular rods C from the recessed socket C' of one tubular rod C to the socket C' of the other tubular rod C, as shown clearly in Fig. 2. When the locking bail-section D' is in open position, as shown in Fig. 3, it is sidewise of the tubular rods C and permits the entering of one of the wheels of the bicycle into the stationary bail-section, so that on moving the swinging bail-section into closed position the rim and tire of the bicycle-wheel are engaged by said bail-sections, as shown in Fig. 2, and thereby the wheel prevented from being removed from the locking-bail.

The coin-operated mechanism by which the swinging bail-section is permitted to be moved from its normally open into its locking position is shown in Figs. 5, 6, and 7 and consists of the fulcrumed and counterbalanced lever E, which projects by one end into an opening of the coin-chute B, while its opposite hook-shaped end engages a recessed disk e, which is attached to the rod $D^2$, so as to lock the latter in its open position. Below the fulcrumed lever E is arranged a second lever F, which is likewise fulcrumed to the casing, but in such a manner as to swing in a plane at right angles to the plane of the lever E and coin-chute B. The lever F is for this purpose fulcrumed to the under side of a lug $f$ in the casing A', one end being provided with two arms $f'$ $f'$, located in different planes, one arm extending into a recess at one side of the coin-chute and the other into a recess at the other side of the coin-chute, while the opposite end of the fulcrumed lever is engaged by pins $f^2$, which are inserted into the rod $D^2$ at right angles to each other, as shown in Figs. 6 and 7. To the rod $D^2$ is applied a tension-spring $d^2$, of which one end is attached to the rod D, while the opposite end is set into a hole in the lock-casing $A'$. The portion of the rod $D^2$ inside of the casing $A'$ is guided in suitable bearings in the lock-casing $A'$, the rod $D^2$ turning in said bearings when the locking-bail $D'$ is moved into closed position, by which motion the spring $d^2$ is set to tension. Alongside of the rod $D^2$ and parallel therewith is arranged a short slide-rod $g$, which is guided in suitable bearings and which is provided with lugs $g'$, that are engaged by a key K, inserted in the lock-casing. By turning the key its bit engages the lugs and lifts the slide-rod $g$ against the tension of a helical spring $g^2$, that is inserted between upper lug $g'$ and the upper bearing of the slide-rod $g$ until the bit of the key abuts against the fixed pin $g^4$ on the inside of the casing $A'$. When by the dropping of a coin into the coin-chute B the fulcrumed lever E is tilted, its hook-shaped end is released from the recessed disk $e$ and the coin passed beyond that end of the tilted lever E that projects into the coin-chute, so as to be dropped on the upper arm $f'$ of the fulcrumed lever F, as shown in Fig. 6. In this position of the coin the lever E is prevented from being returned into its horizontal position. The locking-bail is then moved into closed position by turning the handle $D^3$ of its rod $D^2$. This motion brings the recess of the disk $e$ below the spring-actuated slide-rod $g$, so that the same is moved by its spring into engagement with the disk $e$, whereby the rod $D^2$ and the locking-bail $D'$ are retained in locked position. Simultaneously therewith the key is turned by the action of the lugs $g'$ into line with the keyhole in the front plate of the casing, so that it can be withdrawn by the owner of the bicycle and placed in his pocket. By the turning of the rod $D^2$ one of the pins $f^2$ on the rod $D^2$ engages the end of the fulcrumed lever F and oscillates the same, so that the coin is dropped from the upper onto the lower arm of the lever F, as shown in Fig. 8.

When the bicycle is to be relased, the key is inserted by the wheelman into the keyhole of the lock mechanism A and turned until it abuts against the pin $g^4$. The spring-actuated slide-rod $g$ is simultaneously withdrawn from the recessed disk $e$, so that the rod $D^2$ is free to open automatically by the tension of its torsion-spring $d^2$, whereby the locking-bail is returned into its normally open position, so that the bicycle can be removed from the stand. During the return motion of the rod $D^2$ the second pin $f^2$ on the rod $D^2$ returns the lever F into its former position, so that the coin clears the lower arm in the lower part of the coin-chute B and is dropped either on a horizontal cup H, from which it may be removed if no charge is to be made for the safe keeping of the bicycle, or it may be conducted to a closed receptacle $H'$ if it be desired to retain the coin as a storage charge for the bicycle. The coins are removed from time to time from the receptacle $H'$ by opening the same by means of a key.

When the locking bail-section $D'$ is in its normally open position, the key cannot be removed from the lock, as it is retained in contact with the pin $g^4$ by the lug $g'$ on the slide-rod $g$, as shown in Fig. 5. The key K can only be removed from the lock when the swinging bail-section has been moved into closed position. (Shown in Fig. 8.) This prevents the removing of the key by unauthorized persons while the bicycle-lock is in open position, so that the lock is always in position for use and ready for the closing of the swinging bail-section after a coin has been inserted and the rod of the swinging bail $D'$ released. The key is turned by the downward movement of the slide-rod and lugs, so that it can be readily removed from the keyhole of the lock by the owner of the bicycle. The lock-casing is closed by means of a front plate $A^2$, which is provided with a bolt $a^2$, that is operated by a key, said bolt engaging a recessed transverse bar $a^3$ of the casing, so that the front plate is firmly retained in position for protecting the operating parts of the lock.

Our improved coin-operated lock is operated as follows: It is assumed that the locking bail-section is in its normally open position when the coin is dropped into the coin-chute. In dropping the coin acts on the end of the fulcrumed lever E, so that the same is tilted and its opposite hook-shaped end lifted out of the recess of the disk $e$, as shown in Fig. 6. The coin passes then from the end of the tilted lever E onto the longer arm of the lever F, on which it is retained until the rod $D^2$ is operated. This is accomplished by turning the handle $D^3$ and rod $D^2$, so that the locking bail-section $D'$ is placed around the rim and tire of the bicycle, as shown in Fig. 1. Simultaneously therewith the spring-actuated slide-rod $d^2$ engages the recess of the disk $e$ and locks the swinging bail-section $D'$ into closed position. The key is likewise turned at the same time, so that it can be withdrawn by the owner of the bicycle. At the same time the lever F is oscillated by the action of one of the pins on the rod $D^2$, so that the coin passes from the upper arm onto the lower arm of the lever F, as shown in Fig. 7, which shows the position of the parts when the bicycle is in locked position. When it is desired to unlock the bicycle, the key is first inserted and turned so as to engage the lugs of the slide-rod $g$, which on being withdrawn from the recessed disk e releases the rod D², so that it and the locking bail-section D' are instantly turned into open position by the action of the torsion-spring d². Simultaneously therewith the fulcrumed lever E returns into its normal position in engagement with the recessed disk e, while the lower lever F is oscillated by the second pin on the rod D², so as to be returned into its normal position, the coin being thereby dropped onto the delivery-cup H or into the receptacle H'. This position of the parts is shown in Fig. 5. By the return of the slide-rod into its raised position the lugs g' prevent the key from being removed from the lock as long as the bail is in open position.

Our improved device forms a convenient and automatically-operated lock for bicycles, which is intended to be used on bicycle-stands at riding-academies, restaurants, hotels, or other stopping places, so that the bicycle cannot be removed by any unauthorized person. The same coin-operated mechanism can also be used in connection with a suitable support for locking umbrellas, canes, and other articles in position when not required for use.

Having thus described our invention, we claim as new and desire to secure by Letters Patent—

1. The combination, with a locking-bail, composed of a stationary section and a swinging section, of a spring-actuated handle-rod, to which the swinging bail-section is attached, and a coin-operated mechanism for locking the handle-rod and bail-section in normally open position, substantially as set forth.

2. The combination with a locking-bail, composed of a stationary section and a swinging section, of a spring-actuated handle-rod to which the swinging bail-section is attached, a coin-operated mechanism for locking the handle-rod and bail-section in normally open position, and releasing the handle-rod so as to permit it to be moved into closed position, and means for locking the handle-rod in closed position, substantially as set forth.

3. The combination of two parallel tubular rods, a stationary bail-section connecting the lower ends of said rods, a spring-actuated handle-rod guided in one of the tubular rods, a swinging bail-section attached to said handle-rod, a coin-operated mechanism for releasing the handle-rod and permitting it to be moved into closed position, and means for locking the handle-rod into closed position, substantially as set forth.

4. The combination of a stationary bail-section, a swinging bail-section, a spring-actuated handle-rod to which the swinging bail-section is attached, a coin-operated mechanism for locking and releasing the handle-rod, means for locking the handle-rod and bail-section in closed position, and means for unlocking the handle-rod and permitting it to swing in open position under the action of its spring, substantially as set forth.

5. The combination, with a stationary bail-section and a swinging bail-section, of a spring-actuated handle-rod to which the swinging bail-section is attached, a recessed disk on said handle-rod, a coin-operated lever adapted to lock or release the disk, and a spring-actuated slide-rod, located sidewise of said handle-rod and adapted to engage the disk and lock the handle-rod and bail-section when in closed position, substantially as set forth.

6. The combination, with a stationary bail-section and a swinging bail-section, of a spring-actuated handle-rod, to which the swinging bail-section is attached, mechanism for locking the handle-rod and bail-section in closed position, and mechanism for releasing the locking mechanism and permitting the swinging bail-section to be moved into open position under the action of its spring, substantially as set forth.

7. The combination of a stationary bail-section, a swinging bail-section, a spring-actuated handle-rod to which the swinging bail-section is attached, a coin-operated mechanism for locking the handle-rod and bail-section into normally open position, a coin-chute for the coin, a fulcrumed lever having forked arms extending into the coin-chute, and means on said handle-rod for oscillating said lever and retaining or releasing the coin when the handle-rod is moved into closed or open position, substantially as set forth.

In testimony that we claim the foregoing as our invention we have signed our names in presence of two subscribing witnesses.

FRANK W. BEARDSLEY.
WM. CALHOUN.

Witnesses:
PAUL GOEPEL,
GEO. W. JAEKEL.